US01262597B2

(12) United States Patent
Thakur et al.

(10) Patent No.: US 12,625,979 B2
(45) Date of Patent: May 12, 2026

(54) ENFORCEMENT OF AUTHORIZATION RULES ACROSS DATA ENVIRONMENTS

(71) Applicant: Veza Technologies, Inc., Los Gatos, CA (US)

(72) Inventors: Tarun Thakur, Los Gatos, CA (US); Maohua Lu, Fremont, CA (US)

(73) Assignee: Veza Technologies, Inc., Los Gatos, CA (US)

( * ) Notice: Subject to any disclaimer, the term of this patent is extended or adjusted under 35 U.S.C. 154(b) by 115 days.

(21) Appl. No.: 17/736,338

(22) Filed: May 4, 2022

(65) Prior Publication Data

US 2022/0358228 A1    Nov. 10, 2022

Related U.S. Application Data

(60) Provisional application No. 63/183,989, filed on May 4, 2021.

(51) Int. Cl.
*G06F 21/60* (2013.01)

(52) U.S. Cl.
CPC .................................. *G06F 21/604* (2013.01)

(58) Field of Classification Search
CPC ...................................................... G06F 21/604
See application file for complete search history.

(56) References Cited

U.S. PATENT DOCUMENTS

| | | | | |
|---|---|---|---|---|
| 11,108,828 | B1 * | 8/2021 | Curtis | H04L 63/20 |
| 2014/0122396 | A1 * | 5/2014 | Swaminathan | G06N 5/02 706/14 |
| 2016/0212169 | A1 * | 7/2016 | Knjazihhin | H04L 63/20 |
| 2020/0136888 | A1 * | 4/2020 | Jangam | H04L 41/40 |
| 2021/0234898 | A1 * | 7/2021 | Desai | H04L 63/104 |

* cited by examiner

*Primary Examiner* — Amir Mehrmanesh
*Assistant Examiner* — Forrest L Carey

(57) ABSTRACT

The technology disclosed herein enables enforcement of high-level rules defined by a user across multiple data environments. In a particular embodiment, a method includes receiving a high-level rule from a user for enforcement across a plurality of data environments and interpreting the high-level rule into a computer-readable rule. The method further includes translating the computer-readable rule into an instruction compatible with a data environment of the plurality of data environments. The method also includes providing the instruction to the data environment, wherein the data environment implements the high-level rule within the data environment based on the instruction.

20 Claims, 6 Drawing Sheets

200

RECEIVE HIGH LEVEL RULE 131 FROM USER 141                    201

INTERPRET HIGH LEVEL RULE 131 INTO COMPUTER-READABLE RULE 132    202

TRANSLATE COMPUTER-READABLE RULE 132 INTO INSTRUCTION 133    203

PROVIDE INSTRUCTION 133 TO DATA ENVIRONMENT 121 TO ENFORCE    204

200

RECEIVE HIGH LEVEL RULE 131 FROM USER 141     201

INTERPRET HIGH LEVEL RULE 131 INTO COMPUTER-READABLE RULE 132     202

TRANSLATE COMPUTER-READABLE RULE 132 INTO INSTRUCTION 133     203

PROVIDE INSTRUCTION 133 TO DATA ENVIRONMENT 121 TO ENFORCE     204

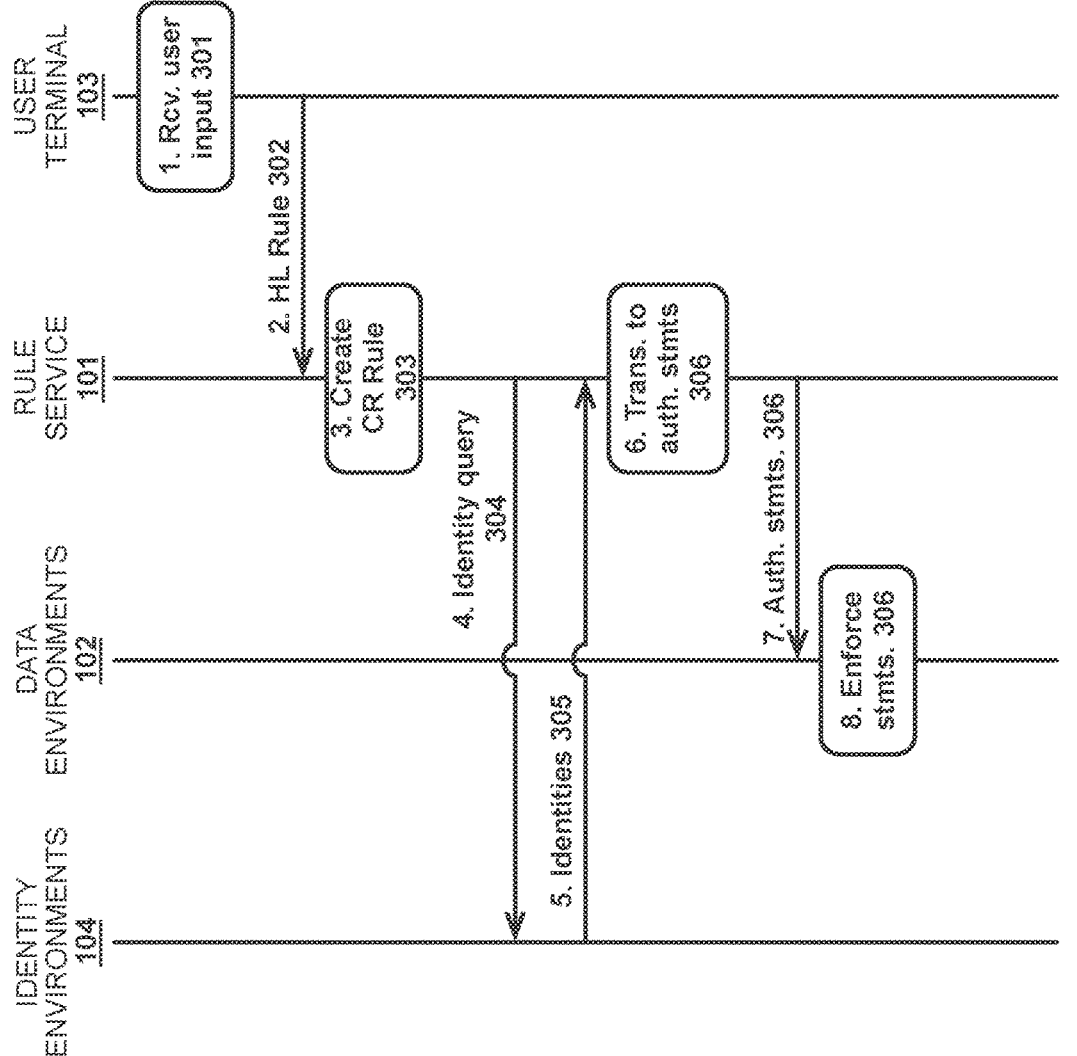
Figure 3

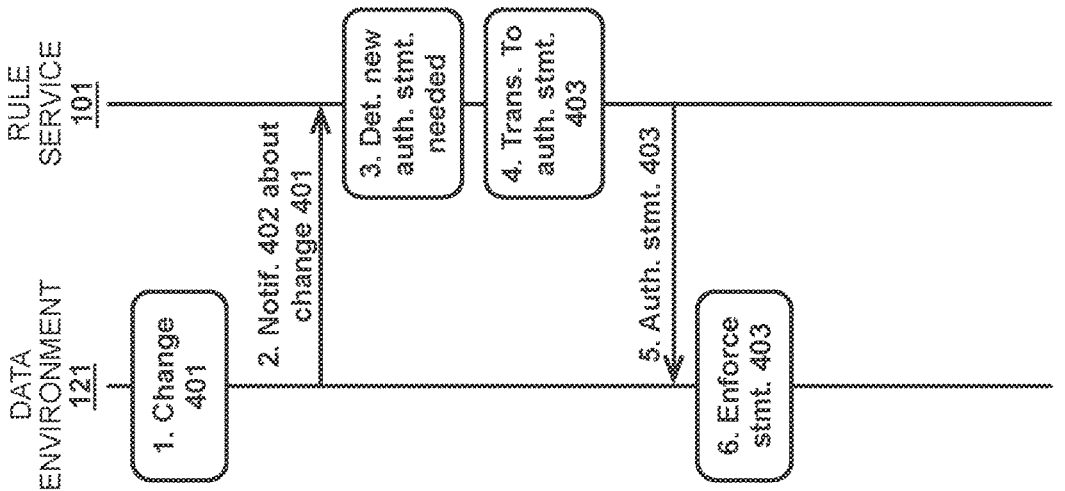
RULE SERVICE 101
DATA ENVIRONMENT 121
1. Change 401
2. Notif. 402 about change 401
3. Det. new auth. stmt. needed
4. Trans. To auth. stmt. 403
5. Auth. stmt. 403
6. Enforce stmt. 403
400
Figure 4

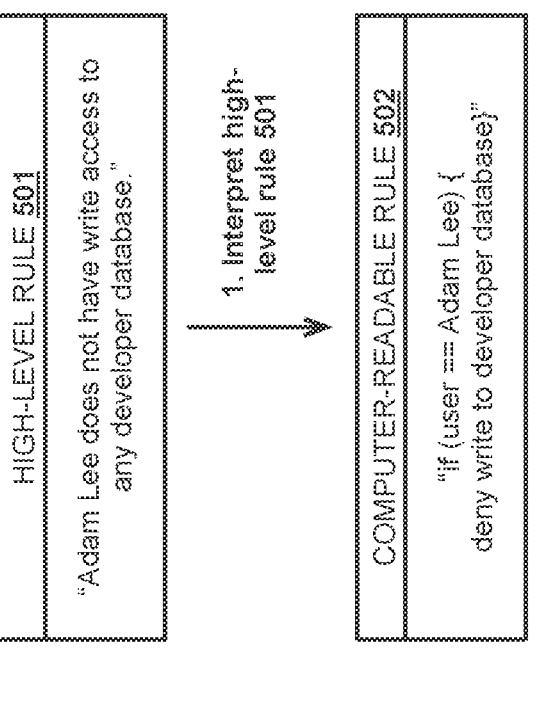

HIGH-LEVEL RULE 501

"Adam Lee does not have write access to any developer database."

1. Interpret high-level rule 501

COMPUTER-READABLE RULE 502

"if (user == Adam Lee) { deny write to developer database}"

2a. Translate to environment specific auth. stmt. 511

2b. Translate to environment specific auth. stmt. 512

AUTHORIZATION STATEMENT 511

"DB = developer1, ACTION = write, USER = adam_lee -> deny"

AUTHORIZATION STATEMENT 512

"Deny if (developer2, write, lee–adam)"

ENFORCEMENT OF AUTHORIZATION RULES ACROSS DATA ENVIRONMENTS

RELATED APPLICATIONS

This application is related to and claims priority to U.S. Provisional Patent Application 63/183,989, titled "ENFORCEMENT OF AUTHORIZATION RULES ACROSS MULTIPLE SYSTEMS," filed May 4, 2021, and which is hereby incorporated by reference in its entirety.

BACKGROUND

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be accessed by which users. Moreover, should the human administrator want to modify permissions for one or more users, the administrator would need to ensure all relevant permissions are changed across all data environments.

SUMMARY

The technology disclosed herein enables enforcement of high-level rules defined by a user across multiple data environments. In a particular embodiment, a method includes receiving a high-level rule from a user for enforcement across a plurality of data environments and interpreting the high-level rule into a computer-readable rule. The method further includes translating the computer-readable rule into an instruction compatible with a data environment of the plurality of data environments. The method also includes providing the instruction to the data environment, wherein the data environment implements the high-level rule within the data environment based on the instruction.

In some examples, the method includes translating the computer-readable rule into another instruction compatible with another data environment of the plurality of data environments and providing the other instruction to the other data environment, wherein the other data environment implements the high-level rule within the other data environment based on the instruction. In those examples, the method may include determining the data environment and the other data environment both include data sources that are subject to the high-level rule. Also, in those examples, the instruction may include an authorization statement compatible with the data environment and the other instruction may include another authorization statement compatible with the other data environment. The authorization statement is different than the other authorization statement.

In some examples, the instruction includes a Create, Read, Update, and Delete (CRUD) statement.

In some examples, the method includes identifying a user indicated in the high-level rule and determining an identity of the user corresponding to the data environment, wherein the identity is included in the instruction.

In some examples, determining that the high-level rule is a valid request.

In some examples, the interpreting includes creating a JavaScript Object Notation (JSON) document that encodes the high-level rule.

In some examples, in response to identifying a change in the data environment, the method includes generating a new instruction based on the computer-readable rule that accounts for the change and providing the new instruction to the data environment, wherein the data environment implements the high-level rule within the data environment based on the new instruction.

In another example, an apparatus is provided having one or more computer readable storage media and a processing system operatively coupled with the one or more computer readable storage media. Program instructions stored on the one or more computer readable storage media that, when read and executed by the processing system, direct the apparatus to receive a high-level rule from a user for enforcement across a plurality of data environments and interpret the high-level rule into a computer-readable rule. The program instructions further direct the apparatus to translate the computer-readable rule into an instruction compatible with a data environment of the plurality of data environments. The program instructions also direct the apparatus to provide the instruction to the data environment, wherein the data environment implements the high-level rule within the data environment based on the instruction.

BRIEF DESCRIPTION OF THE DRAWINGS

FIG. 3 illustrates an operational scenario for enforcing high-level rules across data environments.

FIG. 4 illustrates an operational scenario for enforcing high-level rules across data environments.

FIG. 5 illustrates an operational scenario for enforcing high-level rules across data environments.

DETAILED DESCRIPTION

Different data environments may use different mechanisms to regulate which users have access to which data sources (e.g., applications, application features, data sets, etc.) therein. That is, the mechanisms regulate the privileges that each user has for accessing each data environment and prevent users who are not authorized to access certain data sources from doing so. The rule service described herein manages those different mechanisms on behalf of a user tasked with regulating user access to data sources in the data environment. In particular, the rule service enables a user to enter a high-level rule describing an access permission policy that the user wants implemented across all data environments. The rule service then automatically implements access permissions in each of the data environments that include data sources to which the high-level rule applies. Additionally, should a change be made to one or more of the data environments, the rule service can identify that change and implement access permissions in the data environments to ensure the high-level rule continues to be enforced despite the change.

Figure 1:
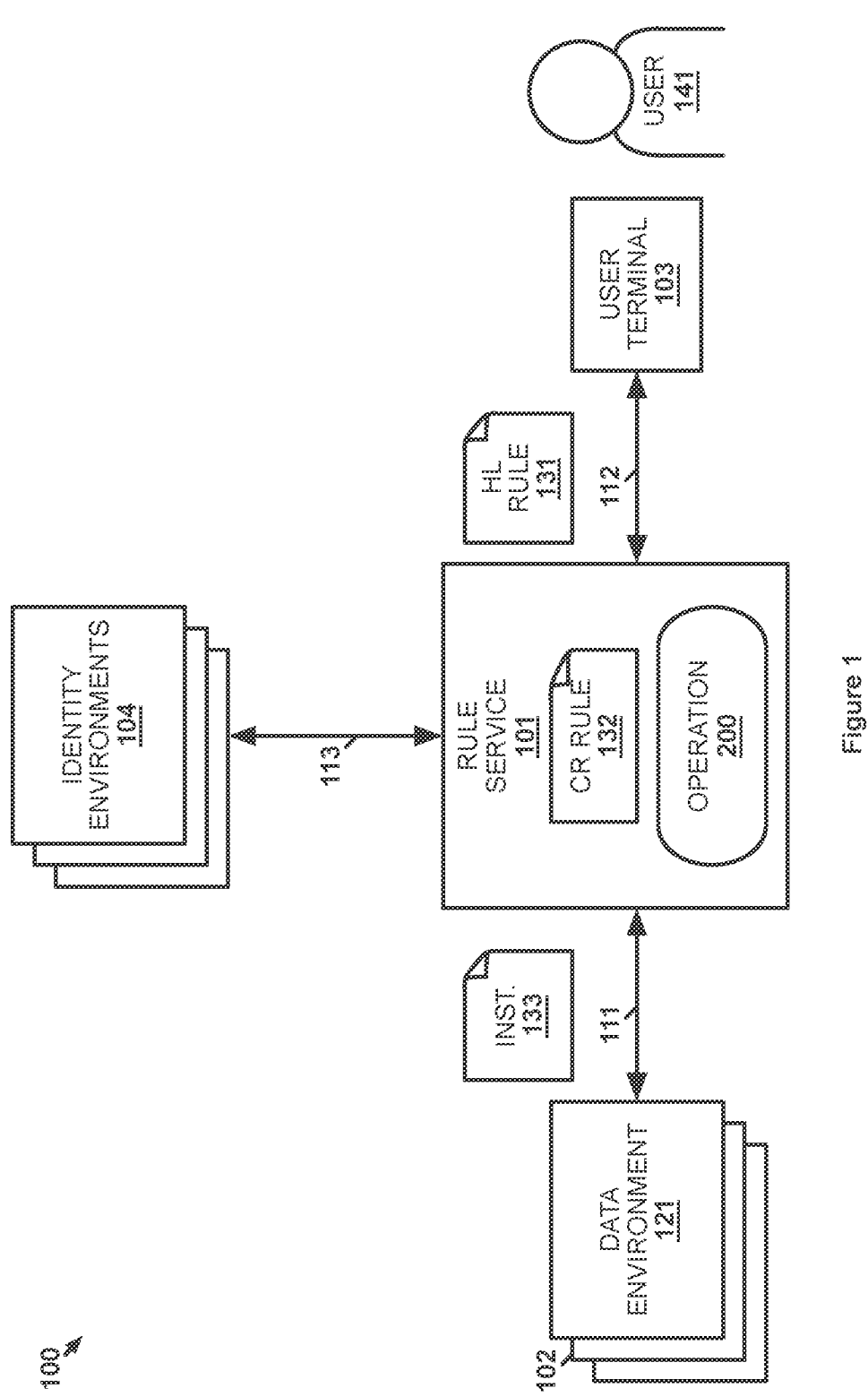
FIG. 1 illustrates an implementation for enforcing high-level rules across data environments.

FIG. 1 illustrates implementation 100 for enforcing high-level rules across data environments. Implementation 100 includes rule service 101, data environments 102, user terminal 103, and identity environments 104. Data environments 102 includes data environment 121. Rule service 101 and data environments 102 communicate over respective communication links 111. Rule service 101 and user terminal 103 communicate over communication link 112. Rule service 101 and identity environments 104 communicate over respective communication links 113. While communication links 111-113 are shown as direct links, communication links 111-113 may include intervening systems, networks, and/or devices. Rule service 101 executes on one or more computing systems, such as server systems, having processing and communication circuitry to operate as described below. User terminal 103 is a user operated computing system, such as a desktop workstation, laptop, tablet computer, smartphone, etc., that user 141 uses to access data environments 102 and/or rule service 101.

In operation, rule service 101 receives high-level rules from user terminal 103 that are input into user terminal 103 by user 141. The high-level rules are automatically implemented as access permissions in data environments 102 to enforce the high-level rules therein. Identity environments 104 include one or more systems that maintain information about users (e.g., user identity information, user attributes, etc.) and may maintain information about which of data environments (including specific data/features therein) each user is allowed to access. Identity environments 104 may include an active directory (AD) server, a privilege account management (PAM) system, human resources management system (HRMS), identity and access governance (IAG) system, cloud-based identity access management system, or any other type of system that maintains the user information discussed above. Users may include human users, such as user 141, non-human users (such as systems, applications, micro-services, etc.), or some combination thereof. Rule service 101 performs operation 200, described below, to enforce high-level rules received from user 141 across data environments 102.

Figure 2:
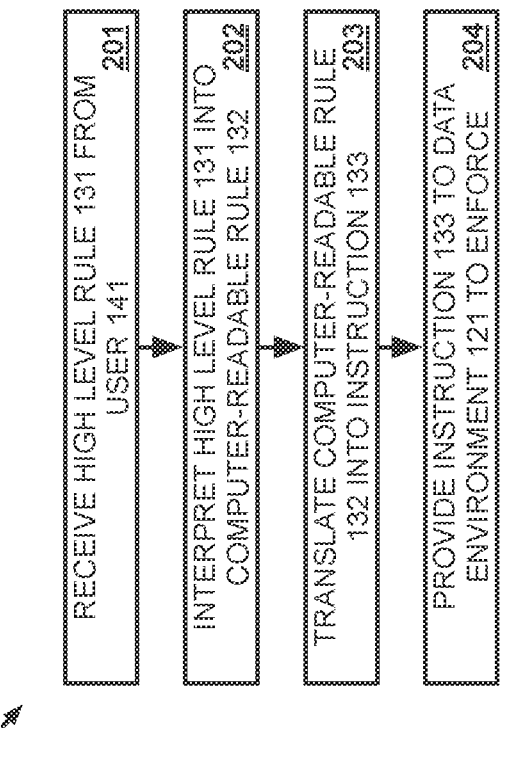
FIG. 2 illustrates an operation to enforce high-level rules across data environments.

FIG. 2 illustrates operation 200 to enforce high-level rules across data environments. In operation 200, rule service 101 receives high-level rule 131 from user 141 for enforcement across data environments 102 (201). In this example, high-level rule 131 is received as input into user terminal 103 by user 141 and is then transmitted to rule service 101. A client for interfacing with rule service 101 may execute on user terminal 103 and provide user 141 with a user interface into which high-level rule 131 is entered. In other examples, a system implementing rule service 101 may provide a user interface to user 141 such that user 141 enters high-level rule 131 into rule service 101 directly rather than through a remote terminal like user terminal 103. High-level rule 131 is high level in the sense that user 141 can use natural language to describe the access privileges that are desired by user 141. User 141 is a human user that is authorized to control user access to data environments 102. In some examples, user 141 may be required to authenticate themselves to rule service 101 (e.g., by submitting a username and password) before rule service 101 will allow user 141 to provide high-level rules for enforcement. By using natural language to define high-level rule 131, user 141 need not know the conventions required by each individual data environment of data environments 102 to implement the rule therein. Likewise, user 141 does not need to sort through all data sources provided by data environments 102 to identify to which of the data sources high-level rule 131 should apply.

After receiving high-level rule 131, rule service 101 interprets high-level rule 131 into computer-readable rule 132 (202). Computer-readable rule 132 is a rule in a format that is understandable by the one or more computers the provide rule service 101. For example, the computer-readable rule 132 may include a JavaScript Object Notation (JSON) document. Rule service 101 may use a natural language processing (NLP) algorithm to determine the intent behind the words used by user 141 in high-level rule 131. In some examples, rule service 101 may use a policy language, such as Rego or Yara-L, to define computer-readable rule 132 from the language of high-level rule 131. In some examples, rule service 101 may validate high-level rule 131 during the interpretation into computer-readable rule 132. Validating high-level rule 131 ensures that user 141 is asking for a policy that can actually be implemented within data environment 121. In some cases, high-level rule 131 may not map into a computer-readable rule 132 (e.g., due to high-level rule 131 missing necessary information, such as the type of data source (e.g., database, table, application, etc.) to which the policy is to apply). Such a failure indicates that the rule is invalid. Upon determining that high-level rule 131 is invalid, rule service 101 may notify user 141 through user terminal 103 to allow user 141 to provide a valid version of high-level rule 131. If rule service 101 recognizes the deficiency of high-level rule 131 that caused it to be invalid, then rule service 101 may indicate the deficiency as guidance to user 141. For instance, if high-level rule 131 is missing the type(s) of data source to which high-level rule 131 is to apply, then rule service 101 may request that information from user 141.

After creating computer-readable rule 132, rule service 101 translates computer-readable rule 132 into instruction 133 compatible with data environment 121 of data environments 102 (203). Data environment 121 is a data environment that includes one or more data sources to which computer-readable rule 132 applies. Rule service 101 identifies the one or more data sources and translates computer-readable rule 132 to apply to those specific data sources. For example, computer-readable rule 132 may apply to databases of a company's legal department and rule service 101 may identify a legal department database in data environment 121. Instruction 133 is created to apply to that legal department database. In some examples, instruction 133 may be formatted as a native authorization statement that is understandable by data environment 121. The format used for instruction 133 may also be of a type that user 141 would use if user 141 entered an instruction themselves to configure data environment 121. In some examples, instruction 133 may be generated as a database Create, Read, Update, and Delete (CRUD) statement. In the above example, the CRUD statement would be drafted to enable or deny access of one or more users defined in computer-readable rule 132 to the legal department database in data environment 121. Instruction 133 may define whether one or more users defined in computer-readable rule 132 have data read, data write, metadata read, metadata write, and non-data—including combinations thereof—access to the data source in data environment 121. Depending on the access permission mechanism used by data environment 121, when computer-readable rule 132 applies to multiple data sources in data environment 121, rule service 101 may need to create a separate instruction for each data source or may be able to create a single instruction 133 that applies to all the data sources.

Data environment 121 may be the only one of data environments 102 that includes data sources to which computer-readable rule 132 applies or data environment 121 may be one of two or more of data environments 102 to which computer-readable rule 132 applies. Different instruction formats may be used for other types of databases or other types of data sources (e.g., applications) depending on the authorization mechanism used by each of data environments 102. Therefore, in examples where computer-readable rule 132 applies to data sources in more than just data environment 121, rule service 101 creates a separate instruction for each data environment that is tailored specifically to the requirements of the data environment and the data sources therein to which computer-readable rule 132 applies.

After creating instruction 133, rule service 101 provides instruction 133 to data environment 121 (204). Data environment 121 implements high-level rule 131 within data environment 121 (i.e., to applicable data sources within data environment 121) based on instruction 133. Instruction 133 may be provided in a message transmitted from rule service 101 to data environment 121, may be provided in as an Application Programming Interface (API) call to data environment 121, or may be supplied to data environment 121 in some other manner so that data environment 121 can carry out instruction 133. In some examples, rule service 101 may provide instruction 133 in the same manner that user terminal 103 would provide instruction 133 had user 141 entered instruction 133 into user terminal 103 to configure data environment 121. If other ones of data environment 121 received their own instructions translated from high-level rule 131, then those data environments also implement high-level rule 131 based on the instructions. As such, high-level rule 131 is enforced across all applicable ones of data environments 102 by providing instructions, including instruction 133, thereto. User 141 does not need to identify the ones of data environments 102 and manually create/provide instructions for each of those identified data environments to enforce their envisioned high-level rule 131.

FIG. 3 illustrates operational scenario 300 for enforcing high-level rules across data environments. Operational scenario 300 is an example of user 141 providing a high-level rule for enforcement across data environments 102. User terminal 103 receives user input 301 at step 1 from user 141. User input 301 may be received via a client application executing on user terminal 103 for interacting with rule service 101. User input 301 defines high-level rule 302, which is a natural human language representation of an access permission policy that user 141 wants to enforce within data environments 102. It should be understood that, when entering high-level rule 302, user 141 need not be concerned with which of data environments 102 high-level rule 302 actually applies. Rather, user 141 need only expect that rule service 101 will enforce high-level rule 302 within data environments 102 by configuring access permissions in any of data environments 102 that maintain an applicable data source.

User terminal 103 transmits high-level rule 302 at step 2 to rule service 101. If a client application executing on user terminal 103 received user input 301, then that same client application may handle the transmittal of high-level rule 302 to rule service 101. Upon receiving high-level rule 302, rule service 101 creates computer-readable rule 303 at step 3 from high-level rule 302. In this example, rule service 101 uses an NLP algorithm to process the natural language in which high-level rule 302 is defined. Components of high-level rule 302 are identified that correspond to elements required to define a rule in a policy language. For instance, rule service 101 may determine a user (or users), a data source (or data sources), and a requested action (or actions), such as deny read access, allow read access, etc., within high-level rule 302. Rule service 101 then arranges those identities, data sources, and actions into syntax required by the policy language.

Before generating authorization statements 306 from computer-readable rule 303, rule service 101 transmits identity query 304 at step 4 to identity environments 104. Identity environments 104 maintain identities that map to the user (or users) indicated in high-level rule 302. For example, the user may be represented by their name (including different arrangements of their name), an employee identification number, or some other identifier, and that representation may differ among the environments in data environments 102. In this example, the user is assumed to be a human user. Although, in other examples, a user may be a system or application that is capable of accessing one or more of data environments 102. In response to identity query 304, identity environments 104 transmit identities 305 at step 5 to rule service 101. Identities 305 include various representations of the user(s) and indicate in which of data environments 102 the various representations are used.

After receiving identities 305, rule service 101 translates computer-readable rule 303 at step 6 into authorization statements 306. Each of authorization statements 306 corresponds to one of data environments 102 that includes at least one data source to which high-level rule 302 is directed to apply. While computer-readable rule 303 may still identify the user(s) from high-level rule 302 by their name(s), each of authorization statements 306 uses an identify from identities 305 corresponding to the one of data environments 102 for which the authorization statement is being translated. Rule service 101 may track the data sources provided by each of data environments 102 to determine which of data environments 102 requires one of authorization statements 306 to fully implement high-level rule 302 in data environments 102. Authorization statements 306 may also be considered a computer-readable rule but are formatted differently than computer-readable rule 303, as may be required by those of data environments 102.

Each of authorization statements 306 are transmitted to their corresponding one of data environments 102 at step 7. Data environments 102 that receive one or more of authorization statements 306 then enforces the authorization statements at step 8 to enforce high-level rule 302 originally requested by user 141. If authorization statements 306 instruct data environments 102 deny access to particular data sources for particular users, then data environments 102 deny access accordingly. Likewise, if authorization statements 306 allow read-only access to certain data sources, then data environments 102 only allow read-only access accordingly. User 141, therefore, need no craft/deploy each individual access statement themselves, assuming they are even able to identify all the access statements that are necessary to enforce their desired high-level rule 302.

FIG. 4 illustrates operation scenario 400 for enforcing high-level rules across data environments. Operational scenario 400 is an example of rule service 101 operating to ensure that high-level rule 302 is enforced even as changes are made to one or more of data environments 102. In operational scenario 400, data source change 401 occurs at step 1 in data environment 121. Data source change 401 may include the addition of a data source, the removal of a data source, a change to characteristics of an existing data source, or some other type of change that could affect whether an access statement of authorization statements 306 received by data environment 121 is still properly enforcing high-level rule 302.

After data source change 401 occurs, change notification 402 is transmitted to rule service 101 at step 2 to notify rule service 101 that data source change 401 occurred. In this example, change notification 402 is pushed to rule service 101 by data environment 121. Although, in other examples, rule service 101 may be query data environment 121 for changes occurring therein. Rule service 101 analyzes data source change 401 to determine at step 3 that a new authorization statement 403 is needed to enforce high-level rule 302 within data environment 121. For example, the previously authorization statement of authorization statements 306 received by data environment 121 may deny a particular user access to certain types of databases and data source change 401 may add another one of those databases that is not yet covered by the previous authorization statement. In that example, rule service 101 determines that authorization statement 403 is needed to cover that new databased to deny access to the particular user.

After creating authorization statement 403, rule service 101 transmits authorization statement 403 at step 5 to data environment 121. Data environment 121 then enforces authorization statement 403 at step 6 to continue enforcing high-level rule 302 in data environment 121. Authorization statement 403 may supplant the previous authorization statement or may be enforced in conjunction with that previous authorization statement to augment the coverage of that previous statement. Advantageously, high-level rule 302 can continue to be enforced even as changes are made to data environments 102.

FIG. 5 illustrates operational scenario 500 for enforcing high-level rules across data environments. Operational scenario 500 is an example of a high-level rule being implemented across data environments 102. High-level rule 501 is an example of high-level rule 302 from operational scenario 300. High-level rule 501 includes language that user 141 may type without concern for computer-readable formatting that would typically be required for implementing access policies. In this example, user 141 has decided that a user named Adam Lee should not have write access to developer databases in data environments 102. As such, user 141 simply types "Adam Lee does not have write access to any developer database" into user terminal 103 to create high-level rule 501.

At step 1 of operational scenario 500, rule service 101 interprets high-level rule 501 into computer-readable rule 502. Rule service 101's processing of high-level rule 501 has identified user Adam Lee from within high-level rule 501, has identified developer databases as being the data source(s) to which high-level rule 501 applies, and has determined that denying write access to those databases is being requested. That identified information is reformatted by rule service 101 into the if-statement language used in computer-readable rule 502. Computer-readable rule 502 is an example access policy language but rule service 101 may use any policy language at this step.

After creating computer-readable rule 502, rule service 101 translates computer-readable rule 502 into authorization statement 511 at step 2a and translates computer-readable rule 502 into authorization statement 512 at step 2b. Authorization statement 511 and authorization statement 512 are examples of authorization statements 306 from operational scenario 500. In this example, rule service 101 identifies two developer databases in data environments 102, designated "developer1" and "developer2," to which Adam Lee should be denied write access. Those two databases are in different ones of data environments 102 and use different syntaxes for their authorization statements. To identify the databases, rule service 101 may maintain a record of all data sources, including characteristics thereof, within data environments 102 and maintains information about the data environments concerning authorization statement requirements for each environment.

In this example, rule service 101 determines that the two data environments in which the two developer databases are located require different formats of authorization statements. Moreover, rule service 101 determines, based on a query to identity environments 104 about Adam Lee, that Adam Lee is represented differently in the two data environments. As such, authorization statement 511 uses the identity "adam_lee" while authorization statement 512 uses "lee-adam". Authorization statement 511 and authorization statement 512 include similar information to computer-readable rule 502 but include specifics tailored to the particular data environments to which the statements will be sent. Specifically, each statement identifies Adam Lee using the environment-specific identifier and identifies a particular database rather than the more general "developer database" provided in computer-readable rule 502.

When rule service 101 sends authorization statement 511 and authorization statement 512 to the applicable ones of data environments 102 (i.e., the environment with database 'developer1' and the environment with database 'developer2'), those data environments enforce authorization statement 511 and authorization statement 512 to deny Adam Lee write access to the respective developer databases. A single high-level rule 501 received from user 141 is, therefore, enforced within data environments 102 using authorization statement 511 and authorization statement 512, which was generated by rule service 101 from high-level rule 501. Should changes occur in data environments 102 to add or remove developer databases, then rule service 101 may generate new authorization statements to account for those changes. Those authorization statements may supplant one or more of authorization statement 511 and authorization statement 512 or may be enforced in addition to those statements.

Figure 6:
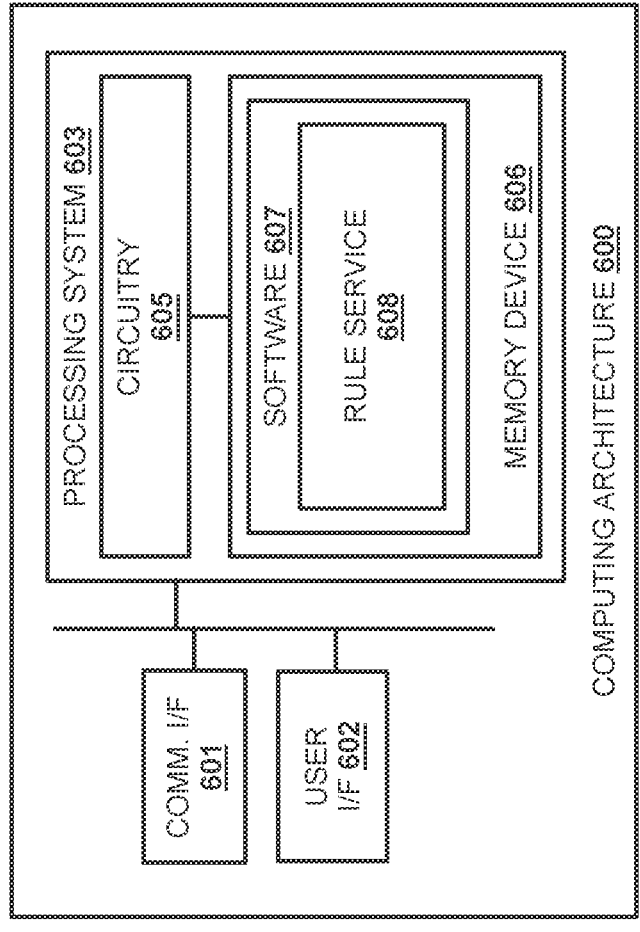
FIG. 6 illustrates a computing architecture for enforcing high-level rules across data environments.

FIG. 6 illustrates computing architecture 600 for enforcing high-level rules across data environments. Computing architecture 600 is an example computing architecture for implementing rule service 101. A similar architecture may also be used for other systems described herein, such as user terminal 103 or systems of environments 102/104, although alternative configurations may also be used. Computing architecture 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises one or more computer readable storage media, such as a disk drive, flash drive, data storage circuitry, or some other memory apparatus. In no examples would a computer readable storage medium of memory device 606, or any other computer readable storage medium herein, be considered a transitory form of signal transmission (often referred to as "signals per se"), such as a propagating electrical or electromagnetic signal or carrier wave. Operating software 607 comprises computer programs, firmware, or some other form of machine-readable processing instructions. Operating software 607 includes rule service module 608. Operating software 607 may further include an operating system, utilities, drivers, network interfaces, applications, or some other type of software. When executed by processing circuitry 605, operating software 607 directs computing architecture 600 to operate as described herein.

In particular, rule service module 608 directs computing architecture 600 to receive a high-level rule from a user for enforcement across a plurality of data environments and interpret the high-level rule into a computer-readable rule. Rule service module 608 further directs computing architecture 600 to translate the computer-readable rule into an instruction compatible with a data environment of the plurality of data environments. Also, rule service module 608 directs computing architecture 600 to provide the instruction to the data environment, wherein the data environment implements the high-level rule within the data environment based on the instruction.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
receiving a high-level rule in natural language from a user for enforcement across a plurality of data environments, wherein the high-level rule identifies a user;
interpreting the high-level rule into a computer-readable rule using a natural language processing algorithm to determine an intent behind words in the natural language, wherein interpreting the high-level rule includes validating that the high-level rule includes sufficient information such that a policy intended by the high-level rule can be implemented within the plurality of data environments;
querying a plurality of identity environments for identities of the user corresponding to different ones of the plurality of data environments, wherein at least one of the identities is different from another of the identities;
selecting an identity of the identities that corresponds to a data environment of the plurality of data environments;
translating the computer-readable rule into an instruction compatible with the data environment, wherein the instruction uses the identity to indicate the user; and
providing the instruction to the data environment, wherein the data environment implements the high-level rule within the data environment based on the instruction.

2. The method of claim 1, comprising:
translating the computer-readable rule into another instruction compatible with another data environment of the plurality of data environments, wherein the instruction uses a second identity corresponding to the other data environment to indicate the user; and
providing the other instruction to the other data environment, wherein the other data environment implements the high-level rule within the other data environment based on the instruction.

3. The method of claim 2, comprising:
determining the data environment and the other data environment both include data sources that are subject to the high-level rule.

4. The method of claim 2, wherein the instruction comprises an authorization statement compatible with the data environment and the other instruction comprises another authorization statement compatible with the other data environment, and wherein the authorization statement is different than the other authorization statement.

5. The method of claim 1, wherein the instruction comprises a Create, Read, Update, and Delete (CRUD) statement.

6. The method of claim 1, wherein the identity indicates the user differently than the user is indicated in the high-level rule.

7. The method of claim 1, wherein validating the high-level rule comprises:
when the policy includes at least one deficiency such that the policy cannot be implemented in the plurality of data environments, notifying the user that the high-level rule is invalid; and
after notifying the user, receiving updates to the high-level rule that remedy the deficiency.

8. The method of claim 1, wherein the interpreting comprises:
creating a JavaScript Object Notation (JSON) document that encodes the high-level rule.

9. The method of claim 1, comprising:
in response to identifying a change in the data environment, generating a new instruction based on the computer-readable rule that accounts for the change; and
providing the new instruction to the data environment, wherein the data environment implements the high-level rule within the data environment based on the new instruction.

10. An apparatus comprising:
one or more computer readable storage media;
a processing system operatively coupled with the one or more computer readable storage media; and
program instructions stored on the one or more computer readable storage media that, when read and executed by the processing system, direct the apparatus to:
receive a high-level rule in natural language from a user for enforcement across a plurality of data environments, wherein the high-level rule identifies a user;

interpret the high-level rule into a computer-readable rule using a natural language processing algorithm to determine an intent behind words in the natural language, wherein interpreting the high-level rule includes validating that the high-level rule includes sufficient information such that a policy intended by the high-level rule can be implemented within the plurality of data environments;

query a plurality of identity environments for identities of the user corresponding to different ones of the plurality of data environments, wherein at least one of the identities is different from another of the identities;

select an identity of the identities that corresponds to a data environment of the plurality of data environments;

translate the computer-readable rule into an instruction compatible with the data environment, wherein the instruction uses the identity to indicate the user; and provide the instruction to the data environment, wherein the data environment implements the high-level rule within the data environment based on the instruction.

11. The apparatus of claim 10, wherein the program instructions direct the apparatus to:

translate the computer-readable rule into another instruction compatible with another data environment of the plurality of data environments; and provide the other instruction to the other data environment, wherein the other data environment implements the high-level rule within the other data environment based on the other instruction.

12. The apparatus of claim 11, wherein the program instructions direct the apparatus to:

determine the data environment and the other data environment both include data sources that are subject to the high-level rule.

13. The apparatus of claim 11, wherein the instruction comprises an authorization statement compatible with the data environment and the other instruction comprises another authorization statement compatible with the other data environment, and wherein the authorization statement is different than the other authorization statement.

14. The apparatus of claim 10, wherein the instruction comprises a Create, Read, Update, and Delete (CRUD) statement.

15. The apparatus of claim 10, wherein the identity indicates the user differently than the user is indicated in the high-level rule.

16. The apparatus of claim 10, wherein to validate the high-level rule, the program instructions direct the apparatus to:

when the policy includes at least one deficiency such that the policy cannot be implemented in the plurality of data environments, notify the user that the high-level rule is invalid; and after the user is notified, receive updates to the high-level rule that remedy the deficiency.

17. The apparatus of claim 10, wherein to interpret the high-level rule, the program instructions direct the apparatus to:

create a JavaScript Object Notation (JSON) document that encodes the high-level rule.

18. The apparatus of claim 10, wherein the program instructions direct the apparatus to:

in response to identifying a change in the data environment, generate a new instruction based on the computer-readable rule that accounts for the change; and provide the new instruction to the data environment, wherein the data environment implements the high-level rule within the data environment based on the new instruction.

19. One or more computer readable storage media having program instructions stored thereon that, when read and executed by a processing system, direct the processing system to:

receive a high-level rule in natural language from a user for enforcement across a plurality of data environments, wherein the high-level rule identifies a user;

interpret the high-level rule into a computer-readable rule using a natural language processing algorithm to determine an intent behind words in the natural language, wherein interpreting the high-level rule includes validating that the high-level rule includes sufficient information such that a policy intended by the high-level rule can be implemented within the plurality of data environments;

query a plurality of identity environments for identities of the user corresponding to different ones of the plurality of data environments, wherein at least one of the identities is different from another of the identities;

select an identity of the identities that corresponds to a data environment of the plurality of data environments;

translate the computer-readable rule into an instruction compatible with the data environment, wherein the instruction uses the identity to indicate the user; and provide the instruction to the data environment, wherein the data environment implements the high-level rule within the data environment based on the instruction.

20. The one or more computer readable storage media of claim 19, wherein the program instructions direct the processing system to:

translate the computer-readable rule into another instruction compatible with another data environment of the plurality of data environments; and provide the other instruction to the other data environment, wherein the other data environment implements the high-level rule within the other data environment based on the other instruction.

* * * * *